Feb. 6, 1945.    A. J. FALARDEAU    2,368,755
AIRCRAFT POWER PLANT
Filed April 19, 1944
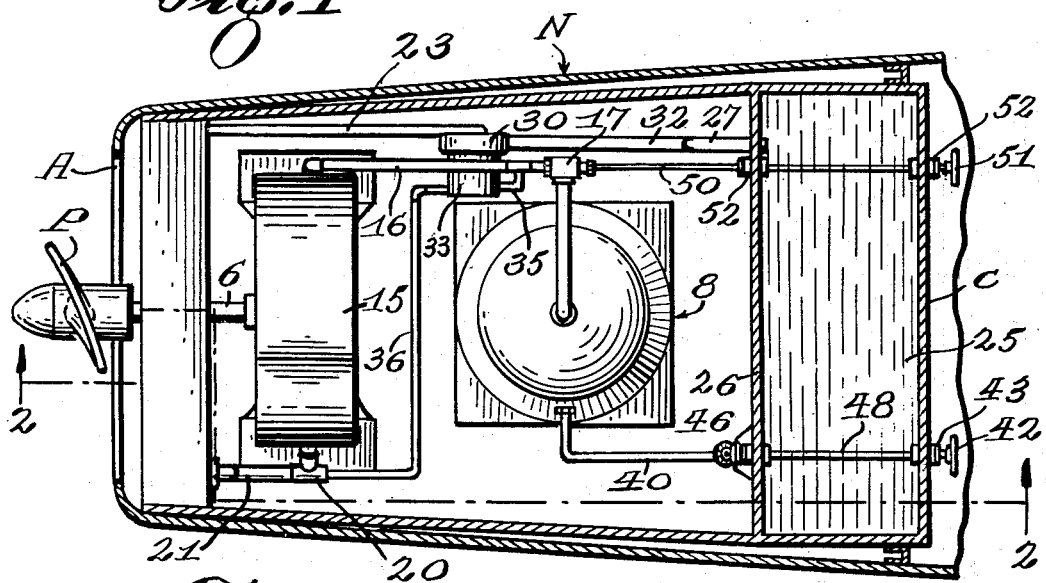
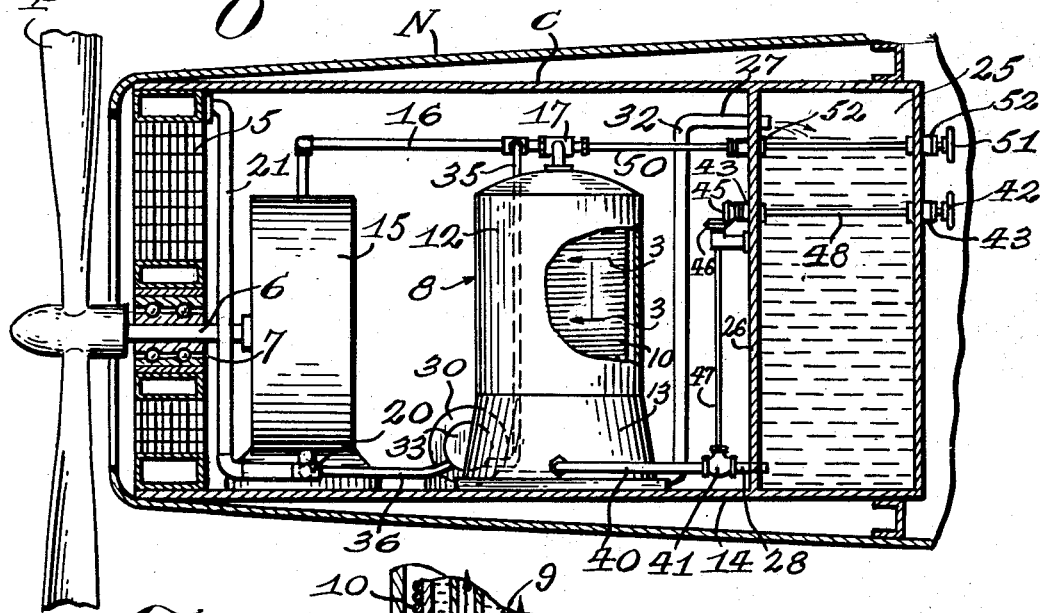
Inventor
Albert J. Falardeau
By Robie H Gastin
Attorneys Patented Feb. 6, 1945

2,368,755

UNITED STATES PATENT OFFICE 2,368,755

AIRCRAFT POWER PLANT

Albert J. Falardeau, Milford, Conn.

Application April 19, 1944, Serial No. 531,718

5 Claims. (Cl. 60—95)

The present invention relates to a steam power plant, and, more particularly, such a plant adapted for use in aircraft.

The main object of the invention resides in the provision of a steam plant of improved performance for propelling aircraft in a more efficient and silent manner.

Another object is the provision of such a steam plant of compact arrangement to occupy a minimum of space, and insulated against heat losses.

A further object concerns a steam plant of the character described adapted to withstand extreme pressures.

Still another object resides in the provision of a steam plant of simple character and adapted to operate without trouble for long periods of time.

A still further object contemplates a power plant of the character described, of relatively inexpensive construction and easily assembled out of separably produced elements.

Other objects and advantages of the invention will become apparent, or be further pointed out, during the description to follow.

As an example, and for purposes of illustration only, a preferred form of the invention is shown in the annexed drawing wherein:

Figure 1 is a plan view of the steam plant showing the relative arrangement of the composite elements, Figure 2 is an elevation taken on the line 2—2 of Figure 1, and Figure 3 is a fractional sectional view of the boiler, showing some constructional features thereof and taken on the line 3—3 of Figure 2.

Referring to the drawing, wherein similar reference characters represent corresponding parts throughout, the letter N indicates generally the nose or fuselage of an aircraft, said nose having a front aperture A immediately in front of which a propeller P is disposed. As shown in the figures, the steam plant of the invention is arranged immediately behind the aperture A which serves as a cool air inlet for condensing the steam issuing from the propeller driving turbine.

The entire plant is completely enclosed within a casing C, which casing may preferably be constituted of steel plate and may, conveniently also, be provided with heat insulating lining to prevent heat losses and insure a uniform operating temperature of the various elements. As shown in Figure 2, the casing C is open at the front and the opening thereof closed by a condenser 5 of the so-called radiator type, which condenser has a substantially central aperture through which the shaft 6 of the propeller extends, said shaft being journalled in ball or roller bearings 7. Thus, the condenser 5 is exposed to the air blast created by the propeller and accordingly operable to condense the steam circulated therein.

The main element of the steam plant is the steam boiler 8, which boiler is constituted of vertical tubes 9 and designed so as to withstand extreme pressures. For that purpose, a steel wire 10 is helically wound to cover completely the outside surface of the boiler body 11, said wire being intended to reinforce the same and also to prevent the destructive effect of an explosion. In order to insulate the boiler proper from heat losses, an insulating casing 12 is provided completely surrounding the boiler against heat losses. Said boiler is properly supported by means of a base 13 to the floor 14 of the casing C, said base 13 enclosing a suitable burner (not shown), which burner to be fed from desired fuel and automatically controlled in any suitable manner.

The boiler therefore constitutes the source of energy for actuating a steam turbine 15 of the rotary vane type and which is directly connected to the driving shaft 6 and also secured to the floor 14 of the casing C. The turbine is connected by means of an inlet pipe 16 to the outlet of the boiler, which outlet is in the form of a throttle valve 17 affording direct communication between said boiler and turbine. The exhaust from the turbine, at 20, into the condenser 5 is effectuated by means of a direct connection 21 making communication with said turbine and the upper chamber of the condenser. The steam condensed in condenser 5 is recuperated as water in the bottom chamber of said condenser and exhausted therefrom through a pipe 23.

The water supply for the plant is constituted by a reservoir 25 adapted to hold a quantity of water and disposed at the back of casing C and formed by a partition 26 in said casing, defining the size of said reservoir 25. This position of the reservoir is thought advisable to act against propagation of fire or other accident to the aircraft in case of explosion or other trouble occurring in the boiler or the steam plant itself. Obviously, the reservoir 25 is adapted to withstand the pressures existing throughout the entire system and provided with inlet 27 and outlet 28.

In order to forcibly circulate the water of condensation from the bottom condenser exhaust 23 and, therefrom, to the inlet 27 of reservoir 25, a circulation pump 30 is provided and which, as shown in Figure 1, is disposed between pipe 23 and pipe 32 making connection with the inlet 27 of the reservoir. The pump 30 may be actuated by a small steam turbine 33 and which, accordingly, is connected in parallel with the larger turbine 15 by means of the pipes 35 and 36. Thus, the steam condensed in said turbine 33 will be collected, together with that issuing from the turbine 15, at 20, and then carried over through 21 to the top of the condenser. Thereafter, suction of pump 30 will be effective to circulate the steam through the condenser and remove the water therefrom for entry, under pressure, to the top of reservoir 25.

Water inlet into the boiler is effectuated through the conduit 40 connected to the outlet 28 of the reservoir by means of a valve 41. Said valve may be actuated from the outside of the casing by means of an operating wheel 42 having a stem 43 passing through the reservoir 25 within packing gland 48. Said stem is provided with a pinion 45 meshing with a similar pinion 46 connected to the elongated stem 47 of the valve. Thus, adjustment of the water inlet, according to conditions, may be conveniently effectuated by the operator from the outside of the plant. Similarly, substantially the same arrangement is provided for operating the throttle valve 17, said valve having a stem 50 extended all the way through the reservoir 35 and terminated by a wheel 51; for purposes of pressure tightness, glands 52 are provided around said stem, as previously explained.

From the foregoing description, it will be apparent that the present invention is an advance of the art pertaining to aircraft, in that it provides driving means for said aircraft which are absolutely silent and devoid of the exhaust noises inherent to the use of internal combustion engines. Also, it is evident that the steam boiler being at all times under pressure, this constitutes a source of constant energy and power acting as a reserve for emergency. Furthermore, it is a known fact that the steam turbine is more flexible than internal combustion engines and more easily controlled. Therefore, an aircraft so equipped would be more efficient than those having gasoline engines only, more easily operable and provided with a power plant of the utmost simplicity.

It must be understood that various changes as to the shape, size and arrangement of parts can be effectuated without departing from the spirit of the invention or the scope of the subjoined claims.

Having thus described my invention, I claim:

1. A power plant of the character described, comprising an open-ended enclosure, a condenser closing one end of said enclosure, a water reservoir closing the other end, and a steam turbine and boiler in the enclosure.

2. In a steam power plant having boiler and turbine, a plant-enclosing casing open at both ends, and a condenser and water reservoir respectively closing the ends of said casing.

3. In an aircraft, an enclosure having an open end exposed to the atmosphere, a condenser closing said open end, a boiler inside said enclosure, a turbine connected to said boiler, and a water reservoir at the other end of the enclosure.

4. An aircraft steam plant, comprising a boiler, a turbine, means for enclosing said boiler and turbine having open ends, a condenser at one end of said enclosing means, a water reservoir at the other end, and communicating means between said boiler, turbine, condenser and reservoir.

5. A steam plant for aircraft, comprising a boiler connected to a turbine, a casing enclosing said boiler and turbine, said casing having open ends, steam throttling means between the boiler and turbine, a condenser closing one end of the casing, a water reservoir at the other end of said casing, means for circulating steam from the turbine through the condenser and thence to the reservoir, and extension means extending to the outside of the casing, through the reservoir, for remotely actuating the steam throttling means

ALBERT J. FALARDEAU.